Nov. 27, 1951  A. A. GENTZHORN  2,576,590
DIMENSION DUPLICATING ATTACHMENT WITH INDICATING MEANS
Filed Feb. 3, 1948  3 Sheets-Sheet 1
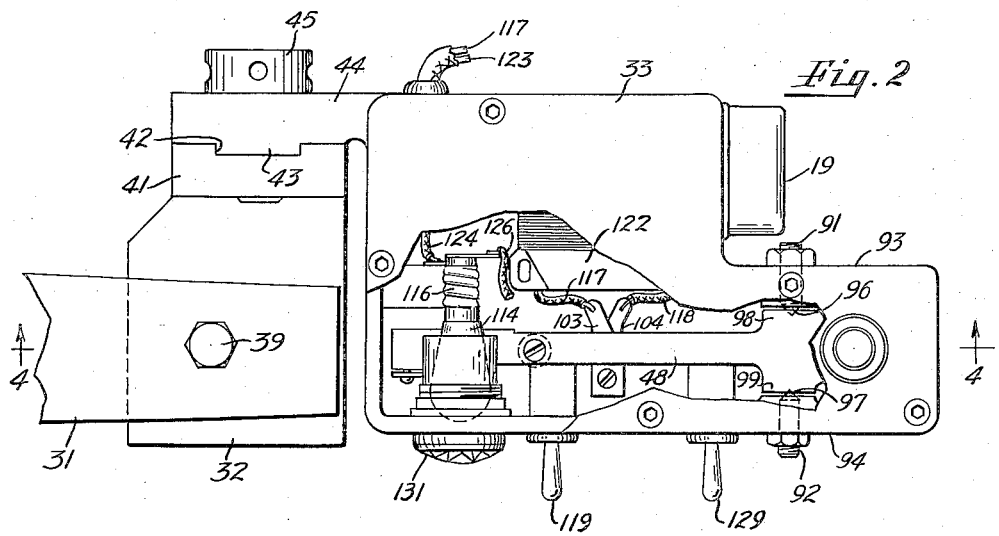
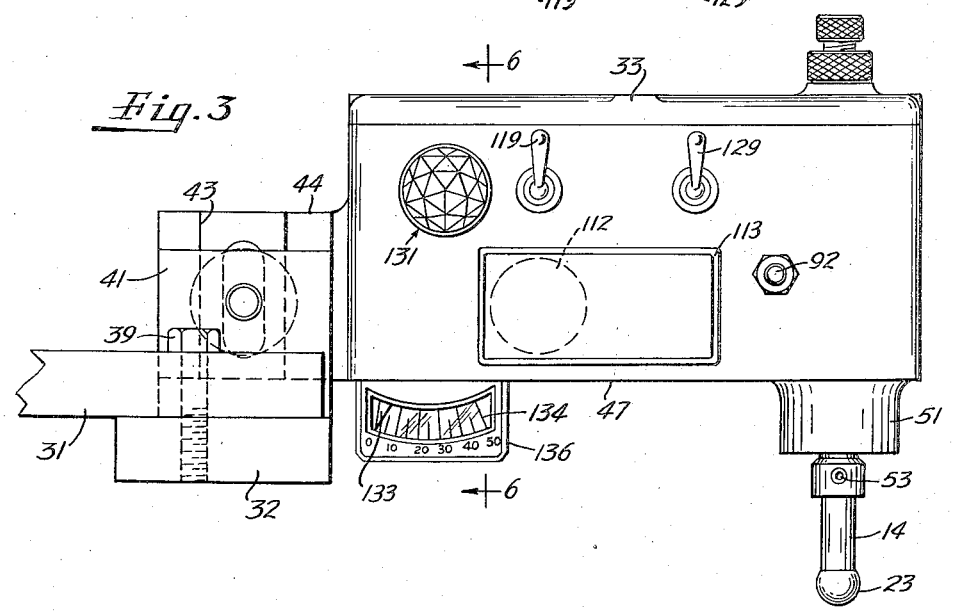
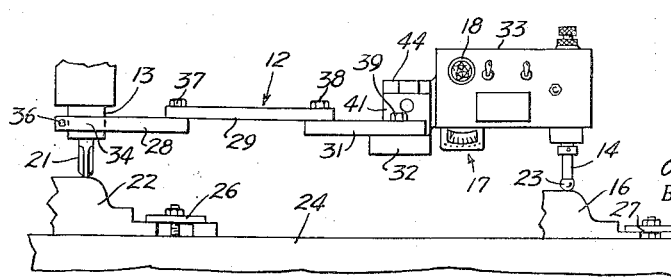
INVENTOR.
Arnold A. Gentzhorn
BY McCanna and Morsbach
ATTYS.

Nov. 27, 1951   A. A. GENTZHORN   2,576,590
DIMENSION DUPLICATING ATTACHMENT WITH INDICATING MEANS
Filed Feb. 3, 1948   3 Sheets-Sheet 2

INVENTOR.
Arnold A. Gentzhorn
BY
McCanna and Morsbach
ATTYS.

Nov. 27, 1951   A. A. GENTZHORN   2,576,590
DIMENSION DUPLICATING ATTACHMENT WITH INDICATING MEANS
Filed Feb. 3, 1948   3 Sheets-Sheet 3
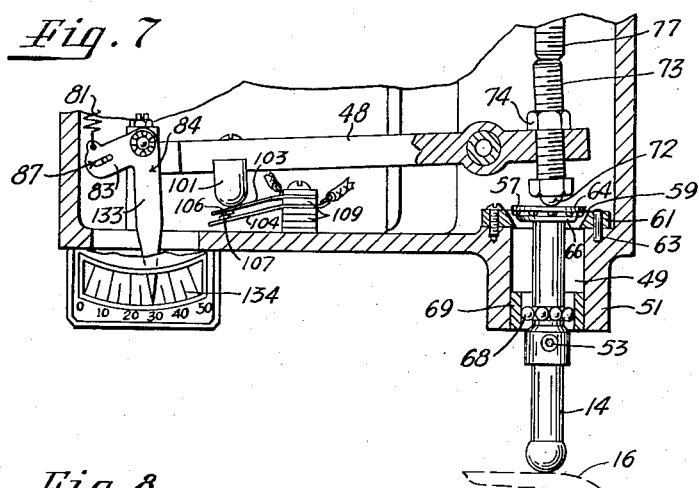
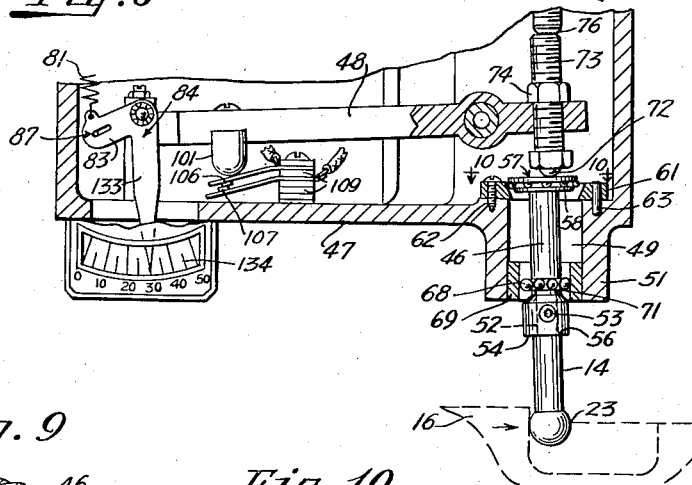
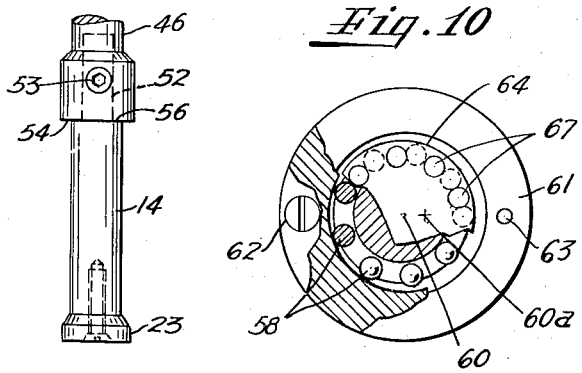
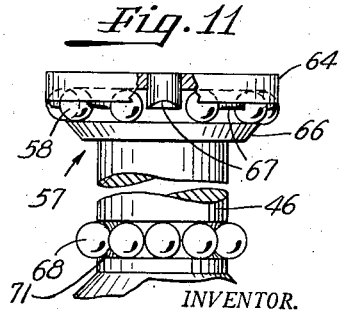
INVENTOR.
Arnold A. Gentzhorn
BY
McCanna and Morsbach
ATTYS.

Patented Nov. 27, 1951

2,576,590

UNITED STATES PATENT OFFICE 2,576,590

DIMENSION DUPLICATING ATTACHMENT
WITH INDICATING MEANS

Arnold A. Gentzhorn, Rockford, Ill.

Application February 3, 1948, Serial No. 5,961

8 Claims. (Cl. 33—172)

This invention relates to a duplicating attachment of the type used with milling machines, lathes, profiling machines, and the like wherein a tracer finger is caused to follow a preselected pattern and controls the position of a cutter relative to a work piece so that the configuration of the pattern is duplicated on the work piece.

Heretofore duplicating mechanisms of the above character have comprised a rigid arm supported at one end by a quill embracing a spindle shaped to receive the cutter and having the tracer finger rigidly supported on the free end of the arm for engagement with the pattern. Normally the work piece and the control pattern are mounted on a movable table or knee so that they move in unison relative to the tracer finger and cutter, respectively. When the table is moved to bring the tracer finger into engagement with the pattern and the cutter into engagement with the work piece, the engagement of the tracer finger with the pattern determines the position of the cutter relative to the work piece. Unless the operator is extremely careful in bringing the pattern into engagement with the tracer finger when the cutter is in operation, the work is apt to be damaged by cutting the latter in an undesired manner. In the past it has been a common practice when the pattern was approaching the tracer finger to utilize a feeler gauge between the tracer finger and the pattern to determine the position of the parts. Thus, as the pattern approached the tracer finger the operator inserted the feeler gauge between the tracer finger and the pattern and moved the gauge back and forth. When it became difficult to remove the feeler gauge, the operator knew that the pattern was engaging the tracer finger and that the desired configuration had been formed on the work piece. This practice requires the use of both of the operator's hands; that is, one hand must be utilized to control the movement of the table and the other hand must be utilized to move the feeler gauge between the tracer finger and the pattern. This method of determining the approach of the pattern to the tracer finger has not been satisfactory because it requires a considerable amount of skill on the part of the operator and in spite of the utmost care the work is frequently damaged.

A primary object of the invention is to provide a duplicating mechanism of the above character with means for automatically indicating the approach and location of the pattern with respect to stable engagement with the tracer finger and the position of the cutter relative to the work piece.

Another object of the invention is to provide a duplicating mechanism of the above character having visual or audible, or both, means for indicating that the pattern is at a predetermined distance from stable engagement with the tracer finger or that the cutter is a predetermined distance from the end of the finish of the cut.

Another object of the invention is to provide a duplicating mechanism of the above character with means for indicating the exact position of the pattern relative to the tracer finger as the pattern approaches stable engagement with the tracer finger or the exact position of the cutter relative to the finished cutting position of the cutter on the work piece.

Another object of the invention is the provision in a duplicating mechanism of the above character, in which the tracer finger has overtravel movement with respect to its support, of means for compensating for said overtravel movement whereby the cutter is in the desired cutting position with respect to the work piece at the end of the overtravel movement.

Another object of the invention is the provision in a duplicating mechanism of the above character of means for indicating the approach of the cutter to the finished cutting position on the work piece which does not require the use of an operator's hands other than to effect movement of the table of the machine.

Another object of the invention is to provide a duplicating mechanism of the above character with means for mounting the tracer finger so that a predetermined displacement of the contact surface of the finger in one axial direction, a transaxial direction or components thereof effects the same indication on the duplicating mechanism.

Another object of the invention is to provide a duplicating mechanism of the above character with means for supporting the duplicating mechanism that permits of maximum adjustability of the position of the duplicating mechanism with respect to the table and pattern with which the unit is used.

Other objects and advantages of the invention will become apparent from the following detailed description taken in connection with the accompanying drawings, in which—

Figure 1 is an elevational view of the duplicating mechanism embodying the invention in position on a vertical milling machine;

Fig. 2 is a fragmentary plan view of the duplicating mechanism having a portion cut away;

Fig. 3 is a fragmentary enlarged elevational view similar to Figure 1;

Fig. 7 is a view similar to Fig. 4 with the tracer finger displaced axially to engage an abutment that limits the relative movement of the tracer finger;

Fig. 8 is a view similar to Fig. 7 with the end of the tracer finger being displaced transaxially;

Fig. 9 is a modification of the tracer finger;

Fig. 10 is a sectional view taken substantially along the line 10—10 of Fig. 8;

Fig. 11 is an enlarged fragmentary view of the chuck, and

Figure 4:
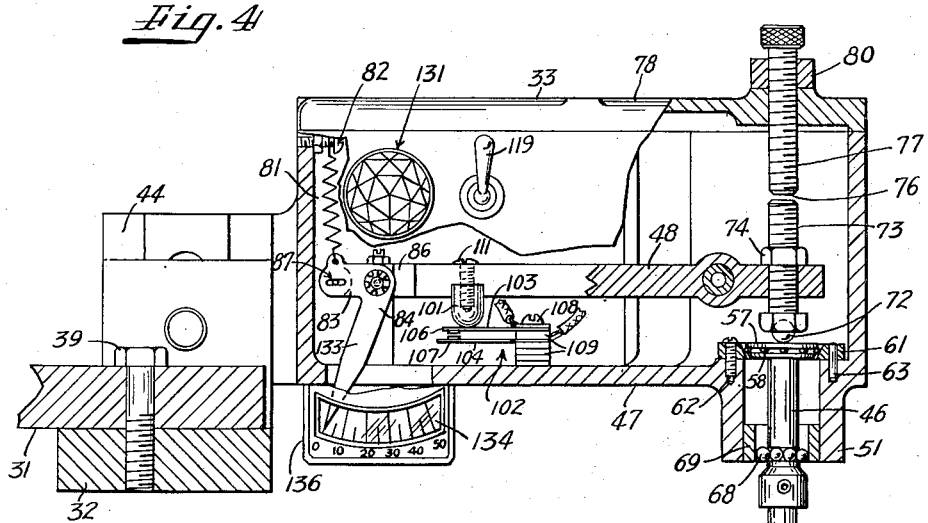
Fig. 4 is a sectional view taken substantially along the line 4—4 of Fig. 2 with the pattern spaced from the tracer finger.

Referring now to the drawings, the invention is shown embodied in a duplicating mechanism adapted for use with a conventional type vertical milling machine. In general, the duplicating mechanism comprises a rigid support 12 shaped to be fixedly attached to a quill 13 of the milling machine, a tracer finger 14 positioned to be engaged by a control pattern 16 and mounted on the support 12 in a manner which permits limited relative or over-travel movement of the tracer finger 14 with respect to the support when the pattern 16 initially engages the tracer finger, and indicating means, such as gauge and signal mechanisms 17, and 18 and 19, respectively, actuated by the relative movement of the tracer finger 14 for indicating to the operator the position of the tracer finger with respect to stable engagement with the control pattern 16 and likewise the position of a cutter 21 with respect to a work piece 22. The parts forming the mounting of the tracer finger 14 and the construction of the tracer finger are coordinated so that for the same displacement of an end 23 of the tracer finger by the pattern 16 in any of a plurality of directions, the cutter 21 is positioned in a desired cutting relation with respect to the work piece 22, and the exact displacement is indicated on the gauge mechanism 17.

To better understand the operation of the duplicating mechanism a brief description of the milling machine upon which it is mounted is included herein. For purposes of simplifying the drawings only the cooperating parts of the milling machine are shown including the quill 13 in which a spindle (not shown) is disposed for driving the cutter 21 and a table 24 for supporting the pattern 16 and the work piece 22. The work piece and pattern are fixedly secured to the table 24 in the usual way as by suitable clamps 26 and 27. It is to be understood that the table 24 is movable bodily in both a vertical and a horizontal direction so that the pattern 16 and the work piece 22 may be moved in any desired vertical and horizontal direction to locate the pattern and the work piece relative to the tracer finger 14 and the cutter 21, respectively, which after an initial set-up are not normally disturbed. While the vertical milling machine is shown for purposes of illustration, it is to be understood that the duplicating mechanism may be used with other suitable types of metal or wood working machines as will be apparent to those skilled in the art. Although the duplicating mechanism is described herein for purposes of illustration as being held in a fixed relation with the milling machine after the initial set-up; where desired, the mechanism may be mounted on a movable member supporting the cutter 21, and the table 24 supporting the work piece 22 and the pattern 16 may be made stationary.

In the embodiment of the invention herein shown the support 12 (see Figures 1, 2 and 3) is formed by links 28, 29 and 31, a bracket 32 and a housing 33 for enclosing the components of the mechanism as will hereinafter be described. The link 28 is rigidly attached to the quill 13 for supporting the links 29 and 31, the bracket 32 and the housing 33 in a cantilever fashion on the machine to overlie the table 24. For this purpose the link 28 is formed with a split collar 34 adjacent one end for receiving the quill 13. The side portions of the collar are clamped against opposite sides of the quill 13, as by a screw 36, to secure the quill and the link 28 in a rigid relation. The opposite end of the link 28 is secured to the bottom of the link 29 as by a tap bolt 37. The link 29 in turn is secured to the top of one end of the link 31 as by a tap bolt 38. The opposite end of the link 31 is secured to the top of the bracket 32 as by a tap bolt 39. The bracket 32 is formed with an upstanding side arm 41 having a groove 42 for slidably receiving a tongue 43 formed on a bracket 44 rigid with the housing 33. A tap bolt 45 extending through the bracket 44 and screwed into the upstanding side arm 41 of the bracket 32 secures the latter and the housing 33 in a rigid relation. With the above construction it is to be understood that the housing 33 may be moved relative to the side arm 41 by loosening the bolt 45 and sliding the bracket 44 relative to the bracket 32. This construction is advantageous in initially setting up the duplicating mechanism on any particular machine because it permits of maximum adjustability of the position of the tracer finger 14 with respect to the pattern 16. For example, it is possible to mount the link 31 on the top of the link 29. It will be noted that this raises the position of the tracer finger 14. In a similar fashion the link 29 may be secured to the underside of the link 28, in which case the position of the tracer finger 14 will be lowered. The number of links utilized between the quill 13 and the housing 33 depends upon the particular application involved. Through the above construction it is possible to locate the cutter 21 at any position ranging from the position wherein the housing 33 abuts against the side of the quill 13 to a position wherein the respective links are all disposed in a straight line.

The tracer finger 14 is supported by a chuck 46 mounted on the housing 33 so that (in this embodiment) regardless of the direction of displacement in one axial direction, transaxial direction or component thereof of the end 23 of the tracer finger the chuck 46 has an axial component of movement equal to the displacement of the end 23. As will be described hereinafter this axial component of movement is utilized in this instance to actuate the gauge mechanism 17 and to control the signaling devices 18 and 19 through a pivotally mounted lever 48. As shown in Figs. 4, 5, 7 and 8 the chuck 46 is disposed in a vertically extending opening 49 formed in a boss 51 on the bottom 47 of the housing. The tracer finger is received in a downwardly extending opening 52 formed in the lower end of the chuck 46 and is secured therein by a set screw 53. Preferably the chuck 46 (see Figs. 8 and 9) is formed with an axial face 54 at its extreme lower end shaped to abut against an annular shoulder 56 formed on the upper end of the tracer finger 14. When the cutter 21 is in the form of a round point end mill the end 23 of the tracer finger 14 may be rounded as shown in Figs. 4, 5, 7 and 8. When the cutter 21 has a flat end, the end 23 of the tracer finger 14 may be of a shape such as shown in Fig. 9. At its upper end the chuck 46 is formed with a head 57 having a plurality of annularly spaced bearings 58 and shaped to be received in an upwardly flaring end 59 of the opening 49. In the present instance the flared end 59 of the opening 49 is formed in a ring 61 secured to the bottom 47 as by a screw 62. A dowel 63 assures correct alinement of the ring 61 with the opening 49. The head 57 (see Fig. 11) is formed by spaced circular plates 64 and 66 secured to the extreme upper end of the chuck 46 and a plurality of ball bearings 58 retained between the plates 64 and 66 and projecting beyond the edges thereof. The bearings 58 are spaced by pins 67 projecting downwardly from the plate 64. Intermediate its ends the chuck 46 is supported in the boss 51 by ball bearings 68 disposed between the chuck 46 and a sleeve 69 positioned at the lower end of the opening 49. The ball bearings 68 are received in and project from an annular groove 71 adjacent the lower end of the chuck 46.

The lever 48 engages the flat upper surface of the head 57 through a bearing 72. In this instance the bearing is formed by a ball bearing mounted in a recess formed in the head of a bolt 73 threaded through the lever 48. The bolt 73 is secured in position by a lock nut 74 abutting against the side of the lever opposite the bearing 72. In the normal position of the lever 48 and chuck 46, the bearing 72 effects a point contact with the head 57 that coincides with the longitudinal axis of the chuck 46.

Axial movement of the chuck 46 is limited by an adjustable abutment 76 formed by the end of a screw 77 extending through the top 78 of the housing 33 in a position to engage the end of the bolt 73 to limit the upward movement of the chuck. By adjusting the position of the screw 77 the upward movement of the chuck may be limited at any desired position, a lock nut 80 securing the screw in an adjusted position. A tension spring 81 is disposed between a screw 82 in the housing 33 and an arm 83 of a bell crank 84 which is connected with an end 86 of the lever 48 through a pin and slot connection 87 to bias the bearing 72 against the head 57 and urge the chuck 46 and the tracer finger 14 to their lower positions.

Figure 5:
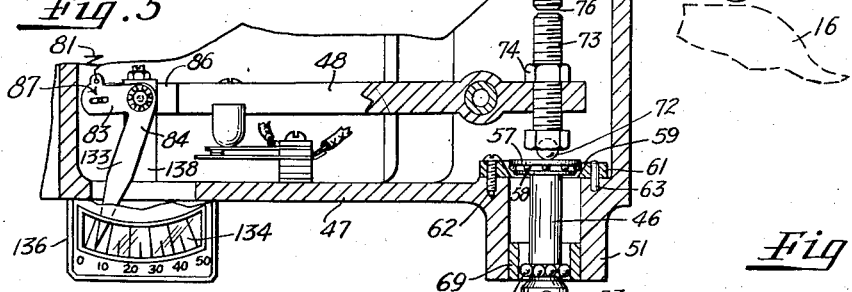
Fig. 5 is an enlarged fragmentary sectional view similar to Fig. 4 with the tracer finger displaced axially a distance sufficient to close the switch contacts controlling a circuit for energizing the signal means.
Figures 6, 12:
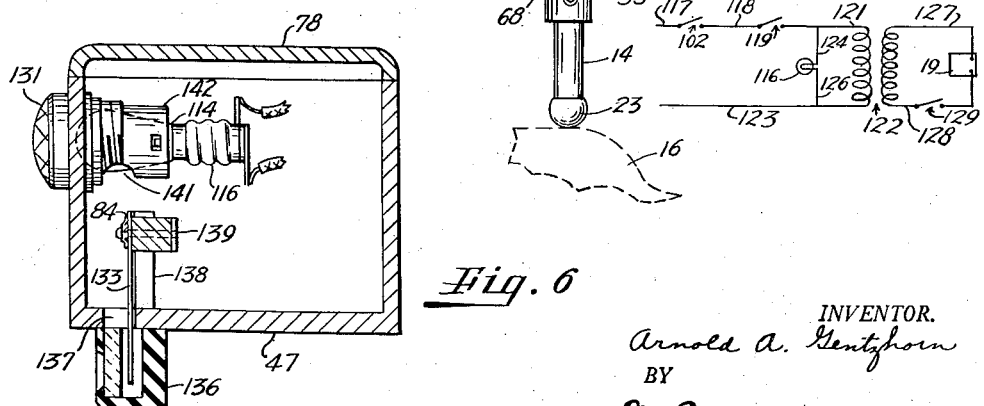
Fig. 6 is a transverse sectional view taken substantially along the line 6—6 of Fig. 3.
Fig. 12 is a diagram of the electric circuit for controlling the signal means.

The above construction will be better understood with the following description of the operation of the respective components. When the pattern 16 engages the contact surface 23 of the tracer finger 14 as shown in Figs. 5 and 6 an upward force is applied to the finger 14 in an axial direction and the chuck 46 is moved along its longitudinal axis. This axial movement of the chuck in turn moves the bearing 72 axially and rotates the lever in a counterclockwise direction to effect on the gauge mechanism 17 an indication of the finger displacement. The chuck 46 is guided in this axial movement by the bearings 68. On the other hand when the pattern 16 engages the side of the tracer finger 14 as shown in Fig. 8 the finger 14 and the chuck 46 form a lever system in which the bearings 68 constitute a fulcrum. Thus, with a force applied to the side of the tracer finger 14, the lever, comprising the finger 14 and the chuck 46, is tilted about its fulcrum as shown in Fig. 8. This movement of the lever causes the head 57 to be forced or cammed upwardly along the inclined side walls of the flared end 59 of the opening 49. Due to the position of the fulcrum the camming action in the flared opening takes place on the same side of the finger 14 as that to which the force is applied by the pattern 16. During this movement of the chuck 46 two of the spaced bearings 58 engage the side walls of the flared end 59 and thereby stabilize the movement of the chuck during the movement of the head up along the inclined side walls. As will be noted in Fig. 8 the movement of the head 57 along the inclined side walls of the flared end 59 provides an axial component of displacement to the bearing 72. Also, it will be noted that because the head 57 is tilted or canted the bearing now contacts the head at a position laterally spaced from the longitudinal axis of the chuck as illustrated in Fig. 10 in which the numeral 60 indicates the longitudinal axis and 60a illustrates the new point of contact. This also provides an additional axial component of movement to the bearing 72. The sum of these axial components equals the displacement of the end 23 of the tracer finger 14. This axial component of movement is in turn indicated on the gauge mechanism 17 through the lever 48. By proper coordination of the lengths of the chuck and the tracer finger, and the angle of inclination of the flared end 59, the axial component of displacement of the head 57 and the bearing 72 is made equal to the displacement of the tracer finger in one axial direction, a transaxial direction, or components thereof, and the same indication is obtained on the gauge mechanism 17.

In order to get an exact duplication of a contour of a pattern on a workpiece, the cutter 21 should be stopped when the finger 14 first engages the pattern. This is not, as pointed out hereinbefore, however, readily determinable. If the operator utilizes a gauge indication for this purpose, relative movement of the tracer finger 14 is necessary in order to get a gauge reading. As soon as the finger 14 has moved relative to its support sufficiently to effect a gauge reading, however, the cutter 21 has cut deeper into the workpiece than desired by the amount of movement of the finger required to get the gauge reading. In the case of forming circular cavities in a workpiece wherein the cutter 21 is moved radially outwardly from a central position for successive cuts, it is apparent that the diameter of the cavity in the workpiece will be larger than the diameter of the cavity in the pattern by a distance corresponding to two times the distance of the overtravel movement of the finger. To overcome the difficulties mentioned above and to insure that the dimensions of the surfaces on the workpiece are the same as on the pattern, provision is made for permitting the operator to use some preselected gauge reading as the "zero point" and then compensating for the relative movement of the tracer finger required to obtain the gauge reading. Thus provision is made so that at the end of the overtravel movement of the finger the cutter 21 is in the correct final cutting relation with the workpiece 22. In other words, one phase of this invention is concerned with provision for anticipating the approach of the cutter to its final position so as to prevent overcutting of the workpiece. In this instance the end 23 of the tracer finger 14 is preshaped so that the radial dimensions of the end 23 are larger than the corresponding dimensions of the cutter by the amount of preselected overtravel movement of the finger.

To better illustrate the aforegoing, assume that the operator has selected the calibration 30 on the gauge as the "zero point," that the cutter is ½" in diameter and has a rounded end as shown in Figure 1, and that the tracer finger is ½" in diameter and has a ball shaped end, the radial dimensions of which are .030" greater than the corresponding radial dimensions of the rounded end of the cutter. Thus the diameter of the end 23 is .060" greater than the diameter of the rounded end of the cutter 21 and the extreme end of the cutter 21 is .030" up from a plane tangent to the extreme bottom of the tracer finger as shown in Figure 1. With the above construction it is evident that as the cutter 21 is moved relative to the workpiece to effect the cutting thereof, that the tracer finger 14 having greater radial dimensions than the cutter will engage the side wall of the cavity in the pattern before it is necessary to stop the cutter. Since the radial dimensions of the finger are .030" larger than the cutter, the cutter may move .030" before it becomes necessary to stop it. Thus, under the conditions assumed the end of the travel of the cutter is anticipated by .030". As the cutter moves this .030" the tracer finger is tilted and effects an indication on the gauge 17. When the needle of the gauge is at 30 the operator knows that the tracer finger is rigid with the suport 12 and any additional movement of the cutter will result in making a cut in the workpiece that is to deep. Consequently when the needle of the gauge is at 30 the operator stops the cutter, the latter being in the correct position to insure that the cut surface will have the same shape and dimensions as the surface which the tracer finger engages. In other words, the increased size of the end of the finger 14 positions the latter with respect to the pattern and the cutter with respect to the workpiece so that regardless of the direction of displacement of the tracer finger by the pattern the cutter is properly positioned with respect to the work piece and the exact configuration of the pattern 16 will be formed on the work piece when the tracer finger reaches the end of its travel.

The signal devices 18 and 19 are for the purpose of indicating to the operator that the cutter 21 is approaching the end of its cutting movement relative to the work piece 22. To this end the signal devices 18 and 19 are arranged herein so that movement of the lever 48 actuates the devices at some predetermined position of the tracer finger 14 before the latter stably engages the pattern 16. The lever 48 is pivotally mounted intermediate its ends as by opposed pointed members 91 and 92 (see Fig. 2). The latter extend through side walls 93 and 94, respectively, of the housing 33 and are received in recesses 96 and 97, respectively, formed on shoulders 98 and 99, respectively, on opposite sides of the lever 48. At a position on the lever 48 spaced from its pivotal axis and on the side thereof away from the chuck 46 the lever is formed wth an actuator 101 (see Figs. 4 and 5) shaped to engage a switch mechanism 102 in a circuit controlling the energizing of the signal devices 18 and 19. In the embodiment herein shown the switch mechanism 102 is formed by leaf springs 103 and 104 having mating contacts 106 and 107 at their ends. The leaf springs are mounted in cantilever fashion as by a screw 108 and are insulated from each other and from the bottom of the housing by insulating members 109. The actuator comprises an insulator 101 secured to one side of the lever 48 by a screw 111 positioned to engage and flex the leaf spring 103 to bring the contact 106 into engagement with the contact 107 when the lever 48 moves counterclockwise. Similarly when the lever 48 rotates in the opposite direction the resiliency of the leaf springs breaks the engagement of the contacts 106 and 107. To permit entrance to the housing 33 an opening 112 (see Fig. 3) beneath the plate 113 is formed in the side wall 94 of the housing 33. The opening is of sufficient size to permit the entrance of a screw driver or the like so that the latter can engage the leaf spring members 103 and 104 and permanently bend them relative to their cantilever mounting. By bending the leaf springs it is possible to obtain actuation of the signal devices 18 and 19 at any desired position of the respective parts.

In this embodiment of the invention the signaling device 18 is in the form of a light bulb 114 which lights up when the contact 106 engages the contact 107 and is visible to the operator and the signal means 19 is in the form of a buzzer. The light bulb 114 is mounted in a socket 116 supported in the housing 33. Power for the light bulb 114 and the buzzer 19 is applied from a circuit connected to an external source of power. The circuit (see Figs. 2 and 12) comprises a conductor 117 adapted for connection to one side of the power supply and connected to the leaf spring 103 of the switch 102, a conductor 118 connected to a terminal on the leaf spring 104 of the switch 102 and connected to one side of a switch 119, and a conductor 121 connected to the other side of the switch 119 and connected with the primary winding of the transformer 122. The opposite side of the primary winding of the transformer is connected to the opposite side of power through a conductor 123. The light socket 116 is connected in parallel with the primary winding of the transformer through conductors 124 and 126. Power for the buzzer 19 is supplied from the secondary winding of the transformer 122 through conductors 127 and 128. A switch 129 is connected in the conductor 128 for interrupting the flow of power to the buzzer. The switch 119 and the switch 129 are mounted in any suitable position on the housing 33. The purpose of switch 119 is to connect and disconnect the duplicating mechanism from the power source.

The above power circuit operates in the following manner, assuming that power is being supplied to the duplicating mechanism.

Upon closing of the switch 102 the light bulb 114 lights up and becomes visible through a glass window 131 mounted on the side 94 of the housing 33. The buzzer 19 is connected to the low voltage winding on the transformer 122 so that upon closing of the switch mechanism 102 it is also energized, providing the switch 129 is in the closed position. The buzzer is supported on the end of the housing 33 as best seen in Fig. 2. It is to be understood that any other suitable visual signaling means may be utilized and that the buzzer may be replaced by a bell, chime, or other audible signaling mechanism. As shown the light bulb 114 is connected in parallel with the power source and the buzzer 19 is supplied from the transformer 122. Where desired batteries may be provided for the buzzer or the buzzer may be operated at the same voltage as the light bulb without the use of the transformer 122.

The gauge mechanism 17 in this embodiment of the invention is in the form of a needle 133 associated with a calibrated scale 134. The position of the needle 133 is controlled by movement of the lever 48. In the specific embodiment shown (see Figs. 4, 5 and 6) the needle 133 is formed by one arm of the bell crank lever 84. The calibrated scale 134 is formed on the back surface of a transparent window as by etching or the like. The window may be formed of clear synthetic resinous and the like materials and is mounted in an opening of a housing 136 for enclosing the needle 133 and attached to the bottom 47 of the housing 33. The needle 133 projects through an opening 137 in the bottom 47 of the housing 33 so as to be in an operative relation with the calibrated dial 134. The bell crank lever 84 is pivotally mounted on an upstanding bracket 138, rigid with the housing 33, as by a pin 139. Movement of the bell crank arm is effected through the pin and slot connection 87 between the lever 48 and the bell crank 84. As best seen in Figs. 4 and 5 rotation of the lever 48 in a counterclockwise direction causes the bell crank 84 to move in a counterclockwise direction and the needle 133 to move to the right relative to the scale 134. The needle 133 is normally biased to its zero position by the spring 81 extending between the screw 82 and the arm 83 of the bell crank lever 84. To facilitate reading the scale 134, provision is made for lighting the latter. In this instance a slot 141 (see Fig. 6) is formed in a sleeve 142 surrounding the light bulb 114 so that light passing through the slot 141 is directed downwardly on to the upper edge of the transparent window 134 so that the window is edge lighted.

The dimensions of the parts of one model of the duplicating mechanism are as follows:

The diameter of the opening at the bottom of the ring 61 is ¾" and the side walls of the flared end 59 of the ring are at an angle of 60° with a plane passing through the bottom of the ring. The circle defined by the annularly shaped bearings 58 mounted in the head 57 is ⅞" in diameter. The distance from the center of the ball race in the head 57 to the center of the ball race defined by the annular groove 71 is 1 9/16". The distance from the ball race defined by the annular groove 71 to the bottom of the chuck is 11/16". The distance from the center of the end 23 of the tracer finger to the bottom of the chuck is 1¾". Where the diameter of the cutter is ½" and it is desired to have an overtravel movement of the tracer finger of .03" the diameter of the end of the tracer finger is 9/16". The lever 48 and bell crank arm 84 may be of any suitable dimensions determined by simple mathematics depending on the sweep of the needle 133 desired.

The operation of the duplicating mechanism may be readily understood from the foregoing but is hereinafter briefly summarized. It is assumed that the duplicating mechanism has been rigidly attached to the quill and that the cutter 21 is in position, that the tracer finger 14 is mounted in the chuck 46, that the adjustable abutment 76 has been adjusted, that the pattern 16 is in position and the milling machine is in operation. The operator initially moves the table of the milling machine so that the pattern 16 engages the end 23 of the tracer finger and the cutter 13 is in cutting relation with the work piece 22. The tracer finger 14 is mounted as hereinbefore described so that when the pattern 16 initially engages the finger the latter is moved relative to the housing 33. This movement of the tracer finger 14 causes the lever 48 to move in a counterclockwise direction about its pivotal support. After a preselected movement of the lever the actuator 101 causes the contact 106 to engage the contact 107 and close the electrical circuit to the light bulb 114 and the buzzer 19. Thus, the noise of the buzzer and the passage of light through the window 134 indicate to the operator that the tracer finger is at a preselected position from stable engagement with the pattern 16 and thereafter care must be taken in feeding the work piece 22 to the cutter 21. Movement of the lever 48 also causes the needle 133 to move from its zero position relative to the scale so that the operator can also visually see just how far the pattern 16 has yet to travel before coming into stable engagement with the tracer finger or in other words just how far the work piece has yet to travel relative to the cutter before the configuration of the pattern 16 is formed on the work piece 22. When the tracer finger reaches the end of its overtravel movement the cutter will be at its finished cutting position.

I claim:

1. In a duplicating mechanism, the combination of indicating means, a support having an annular opening defined by side walls which taper inwardly from the upper end of the opening, a chuck extending downwardly through said opening and provided at its upper end with a circular head having a flat upper surface, said head being formed at its periphery with a plurality of annularly spaced bearing surfaces abutting the tapered side walls defining said opening for suspending the chuck therefrom, a lever pivotally mounted on said support for actuating said indicating means, a bearing surface unitary with the lever and engaging the flat upper surface on the head whereby movement of the head simultaneously moves said lever, a tracer finger rigid with said chuck and having a contact surface for engagement by a pattern, and bearing means positioned below the annular opening acting between said chuck and said support to guide the chuck upon axial displacement thereof and forming a fulcrum for transaxial displacement of the contact surface to force the head up along the inclined side walls of the annular opening to move the lever for actuating the indicating means.

2. In a duplicating mechanism, a support formed with an opening defined by a downwardly extending and inwardly tapering annular surface, elongated means for supporting a tracer finger extending downwardly below said opening, said elongated means terminating at its upper end in a transversely extending circular head member, said head member being formed at its periphery with a plurality of annularly spaced bearing surfaces for abutment with the tapering annular surface which defines said opening, whereby said elongated means is freely supported by said tapering annular surface for upward and transaxial movement, said head member also being formed with a flat upper face defining a bearing surface, and means in engagement with said upper face and actuated by movement thereof to control an indicator, said last mentioned means being positioned to normally engage the center of said upper face when said elongated means is undisplaced transaxially and movable transversely over said face responsive to transaxial movement of said elongated means.

3. In a duplicating mechanism, a support having an opening defined by a downwardly extending and inwardly tapering annular surface, elongated means for supporting a tracer finger extending downwardly below said opening, said elongated means terminating at its upper end in a transverse head member, said head member being provided with a plurality of annularly spaced bearings for abutment with the tapering annular surface which defines said opening for suspending the elongated means therefrom, said suspension mounting for the elongated means permitting upward and transaxial displacement thereof, said head member also being formed with a flat upper face defining a bearing surface, and means positioned above said elongated means for actuating an indicator, said last mentioned means being formed with a bearing member engaging the upper face of the head member and movable over said upper face responsive to transaxial movement of said elongated means.

4. In a duplicating mechanism, the combination of indicating means, a support having an upper circular opening defined by a downwardly extending and inwardly tapering annular surface, said support also being formed with a lower circular opening vertically aligned with and communicating with said upper opening, elongated means for supporting a tracer finger extending downwardly through said upper and lower openings, said elongated means being provided with a plurality of annularly spaced bearing members for engagement with the side walls defining said lower opening, said bearing engagement forming a guide for upward displacement of the elongated means and forming a fulcrum upon transaxial displacement of the elongated means, a tracer finger rigid with said elongated means and depending therefrom having a contact surface for engagement with a pattern, said elongated means terminating at its upper end in a transverse circular head member provided at its periphery with a plurality of annularly spaced bearings in engagement with the tapering annular surface which defines the upper opening, said head member being formed with a flat upper face defining a bearing surface, and a lever pivotally mounted on said support for actuating said indicating means, a depending portion unitary with said lever and having a lower bearing surface in engagement with the upper face on said elongated means, said lower bearing surface for the lever being aligned with the longitudinal axis of said elongated means when the tracer finger is undisplaced transaxially and movable over said upper face to be displaced from said longitudinal axis responsive to transaxial movement of the tracer finger.

5. In a duplicating mechanism, a support having an opening defined by a downwardly extending and inwardly tapering annulus which forms a frusto-conical bearing surface, elongated means for supporting a tracer finger extending downwardly below said opening, a tracer finger rigid with said elongated means and depending therefrom, said elongated means terminating at its upper end in a transverse head member, said head member being formed with a plurality of annularly spaced bearings for abutment with the frusto-conical bearing surface which defines said opening, each of the bearing surfaces on said head member engaging said frusto-conical bearing surface when the elongated means is suspended from said frusto-conical bearing surface, said head member being movable responsive to transaxial displacement of the tracer finger to be tilted so as to engage the frusto-conical surface at two adjacent annularly spaced bearing surfaces on said head member, whereby to inhibit rotary movement of said head member in the tilted position and to inhibit movement of said elongated means in a transaxial direction displaced from the direction of movement of said tracer finger, said head member being formed with a flat upper face defining a bearing surface, and means positioned above said elongated means for actuating an indicator, said last mentioned means being formed with a bearing member engaging the upper face on the head member and movable responsive to movement thereof.

6. In a duplicating mechanism, a support having an opening defined by a downwardly extending and inwardly tapering annular surface, elongated means for supporting a tracer finger extending downwardly below said opening, said elongated means being formed with annularly spaced bearing surfaces for engagement with the tapering bearing surface defining said opening for suspending the elongated means therefrom, said suspension mounting for the elongated means permitting upward and transaxial displacement thereof, said elongated means terminating at its upper end in a transverse head member formed with a flat upper face defining another bearing surface, and means mounted on said support for actuating an indicator, said last mentioned means being formed with a bearing surface engaging the upper face on the head member and movable over said face responsive to transaxial displacement of the elongated means.

7. In a duplicating mechanism, a support having an opening defined by a downwardly extending and inwardly tapering annular surface, elongated means for supporting a tracer finger extending downwardly below said opening, said elongated means terminating at its upper end in a transverse head member having bearing surfaces for engagement with the bearing surface defining said opening to suspend the elongated means therefrom, said suspension mounting for the elongated means permitting upward and transaxial displacement thereof, said head member being formed with a flat upper face defining another bearing surface, a lever pivotally mounted on said support for actuating an indicator, a transverse arm attached to said lever and extending above and below said lever, the depending portion on said arm being formed with a bearing surface engaging the upper face on the head member and movable over said face responsive to transaxial displacement of the elongated means, and stop means disposed above the upwardly extending portion of said arm for limiting the movement of said pivoted lever.

8. In a duplicating mechanism of the type having a tracer finger engageable with a pattern for controlling the position of a cutter or the like with respect to a work piece, a support having an opening defined by a downwardly extending and inwardly tapering annular surface, elongated means for supporting the tracer finger extending downwardly below said opening, a tracer finger rigid with said elongated means and depending therefrom, said elongated means terminating at its upper end in a transverse head member having bearings for engagement with the bearing surface which defines said opening, whereby said elongated means is freely supported by said tapering annular surface for upward and transaxial movement, said head member being formed with a flat upper face defining another bearing surface, means mounted on said support for actuating an indicator, said indicator actuating means being formed with a bearing surface engaging the upper face on the head member and movable over said face responsive to transaxial displacement of the tracer finger, indicator means, and a switch spaced from said indicator actuating means and controlling the energization of said indicator means, said indicator actuating means being movable responsive to predetermined movement of the tracer finger to engage said switch for energizing the indicator means to indicate that the tracer finger is a predetermined distance from stable engagement with the pattern.

ARNOLD A. GENTZHORN.

REFERENCES CITED

The following references are of record in the file of this patent:

UNITED STATES PATENTS

| Number | Name | Date |
| --- | --- | --- |
| 763,011 | Mietaschk | June 21, 1904 |
| 1,966,618 | Egorenkov | July 17, 1934 |
| 2,130,109 | Turchan | Sept. 13, 1938 |
| 2,249,413 | Bechtle et al. | July 15, 1941 |
| 2,302,506 | Richards | Nov. 17, 1942 |
| 2,335,304 | Parsons | Nov. 30, 1943 |
| 2,386,825 | Turchan et al. | Oct. 16, 1945 |
| 2,421,827 | Boyd | June 10, 1947 |
| 2,439,565 | Egor | Apr. 13, 1948 |